July 17, 1934.    E. L. KRAFT    1,966,983
WINDSHIELD FOR AUTOMOBILES
Filed Sept. 23, 1931    3 Sheets-Sheet 1
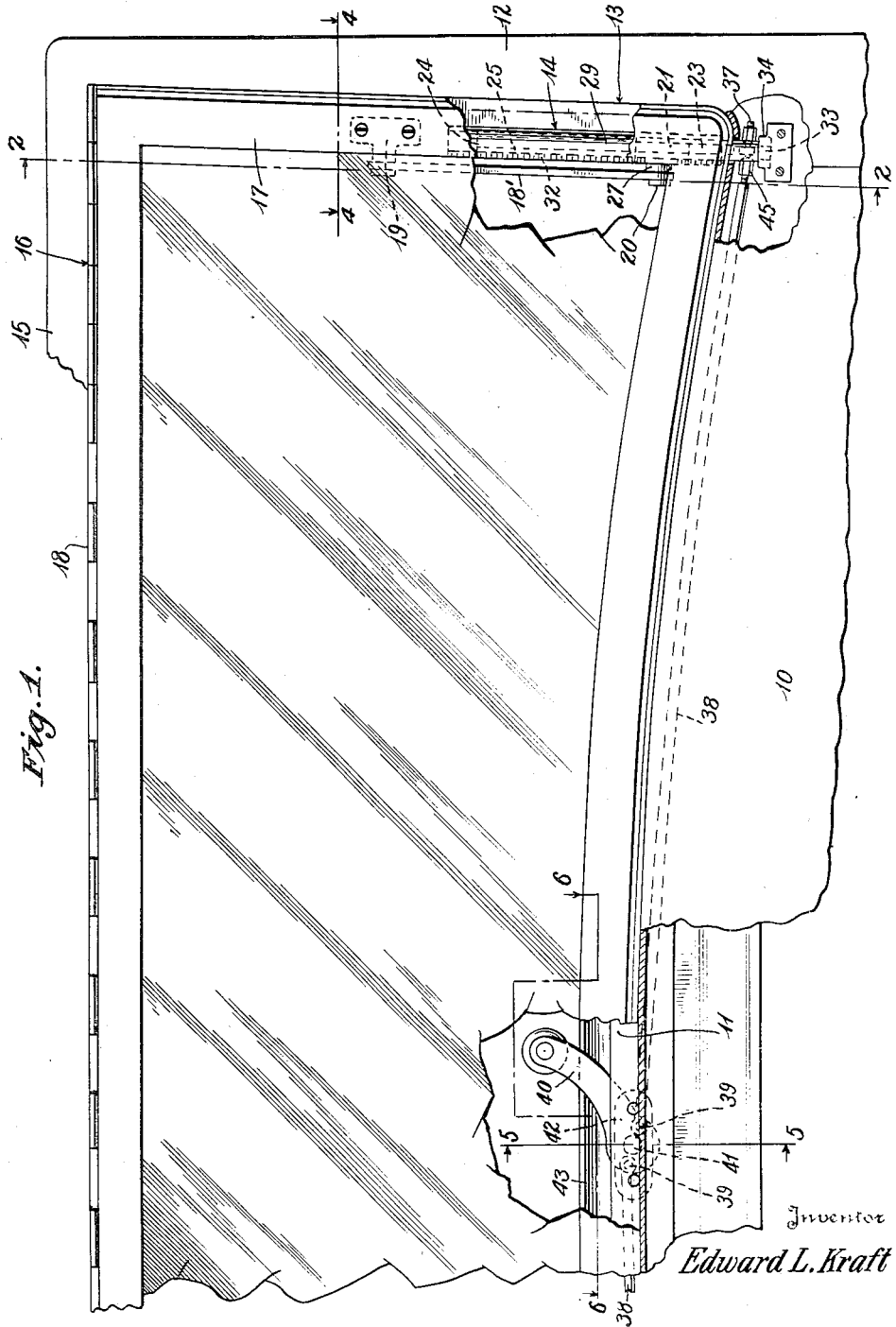

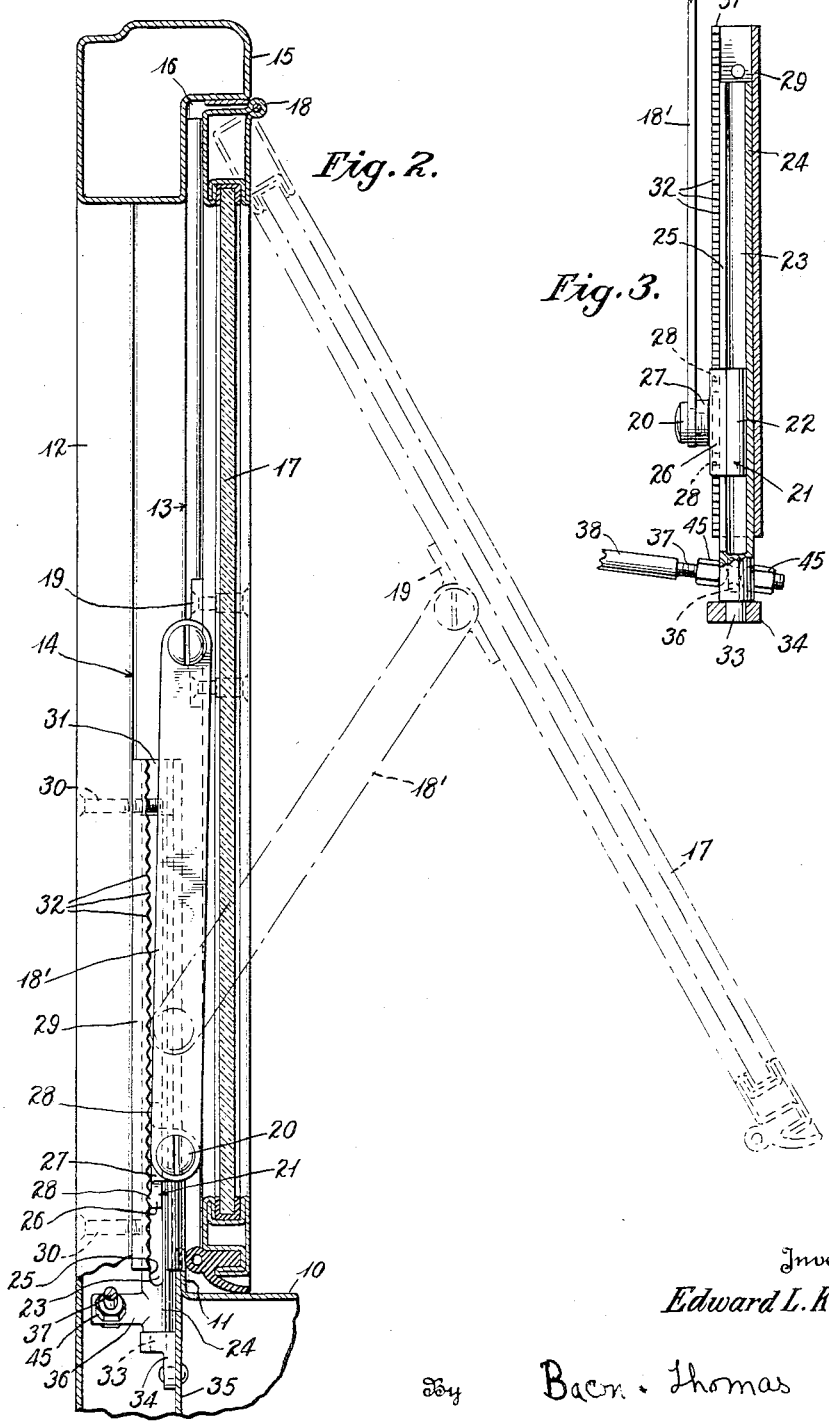

July 17, 1934.  E. L. KRAFT  1,966,983
WINDSHIELD FOR AUTOMOBILES
Filed Sept. 23, 1931   3 Sheets-Sheet 3

Inventor
Edward L. Kraft
By Bacon & Thomas
Attorneys

Patented July 17, 1934

1,966,983

UNITED STATES PATENT OFFICE 1,966,983

WINDSHIELD FOR AUTOMOBILES

Edward L. Kraft, York, Pa., assignor to Martin-Parry Corporation, York, Pa., a corporation of Delaware Application September 23, 1931, Serial No. 564,683

3 Claims. (Cl. 296—84)

This invention relates to improvements in windshield controlling mechanism and deals more specifically with the general type of control illustrated and broadly claimed in Patent No. 1,821,903, issued to A. B. Beitman on September 1, 1931.

The primary object of this invention is to provide mechanism by means of which a pivoted windshield may be retained in any desired position of adjustment.

A further object of the invention is to provide controlling mechanism for a windshield which is carried substantially entirely by the immovable frame portion of the windshield.

A still further object of the invention is to provide mechanism for retaining a windshield in any desired position of adjustment, the said mechanism being of exceedingly simple construction, one which may be combined with many of the present-day types of pivoted windshields, and one which may be manufactured and maintained at a very nominal cost.

Figure 4:
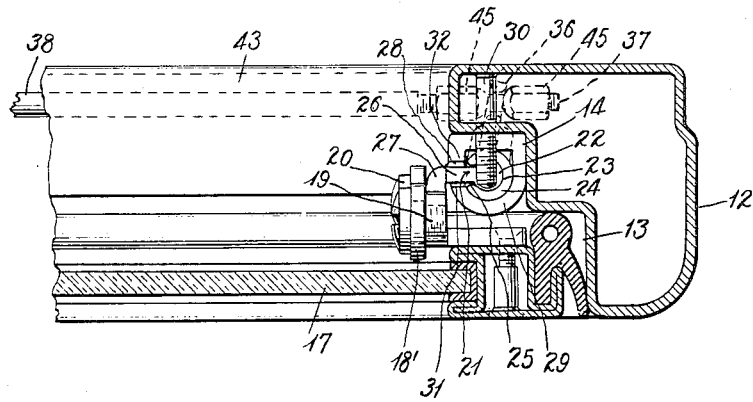
Figure 5:
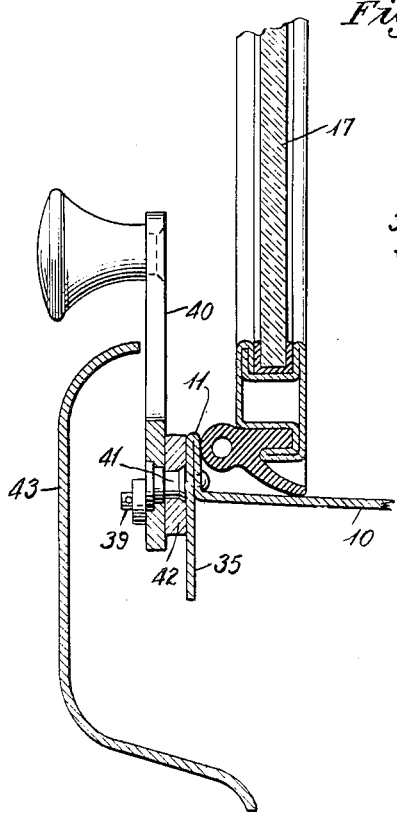
Figure 6:
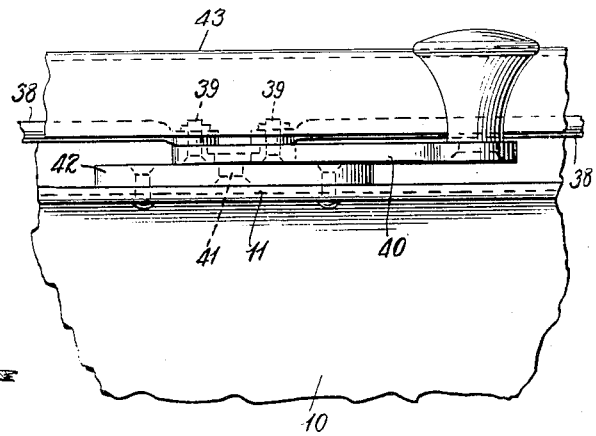

Other objects or advantages of the invention will be apparent during the course of the following description:

In the accompanying drawings forming a part of this specification, in which like numerals are employed to designate like parts throughout the same, Figure 1 is a fragmentary front elevational view of a windshield having associated therewith the controlling mechanism embodying this invention, Figure 2 is a vertical sectional view taken upon line 2—2 of Fig. 1, Figure 3 is a detailed elevational view of a portion of the controlling mechanism, Figure 4 is a fragmentary transverse sectional view taken upon line 4—4 of Fig. 1, Figure 5 is a fragmentary vertical sectional view taken upon line 5—5 of Fig. 1, and Figure 6 is a fragmentary detailed view taken upon line 6—6 of Fig. 1.

In the drawings, wherein for the purpose of illustration is shown a preferred embodiment of the invention, the numeral 10 designates in its entirety the cowl portion of a motor vehicle. This cowling is provided with an upstanding flange 11 at its inner longitudinal edge. At opposite sides of the cowling 10, the vehicle body is formed with corner posts 12. These corner posts are of hollow formation and are formed with two offset portions 13 and 14. The upper ends of the corner posts 12 are suitably connected to a header 15. Fig. 2 discloses this header as being formed with an offset portion 16 which is in the same vertical plane with the offset portion 13 in the corner posts. The offset portions 13 and 16 constitute a seat for the pivoted windshield 17, which is hinged at 18 to the header 15.

At one or both ends of the windshield 17, there are provided bracing arms 18′. Each arm has one end pivotally connected to the windshield by means of the bracket plate 19. The remaining end of each bracing arm 18 is pivotally connected, as by means of the screw 20, to a block 21. This block is formed with an elongated substantially cylindrical portion 22 slidably received within the bore 23 of an actuating tube 24. This tube is longitudinally slotted at 25 to slidably receive the radially extending, plate-like portion 26 of an arm 27 which is connected to the cylindrical portion 22 of the block 21. The screw 20, previously described as pivotally connecting the bracing arm 18′ to the block 21, is threadedly connected to this arm 27 of the block. One face of the flange or plate-like portion 26 of the block is provided with a plurality of teeth 28 which are arranged in a vertical series. The actuating tube 24 is rotatably received within a housing 29 which is secured by screws 30 to a corner post 12 and is positioned within the offset portion 14 of this corner post. This housing 29 is formed with a longitudinally extending slot 31, one longitudinal edge of which is formed with a series of teeth 32. The plate-like shank portion 26 of the arm 27, which forms a part of the block 21, passes through the slot 31 of the casing 29 so that the teeth 28 formed on this shank are operatively associated with the teeth 32 formed on the edge of the housing 29.

The lower end of the actuating tube 24 is formed with a journal 33 received within an opening formed in the bearing bracket 34 secured to the flanged portion 35 of the cowling 10. This structure constitutes a rotatable support for the lower extremity of the actuating sleeve 24. An arm 36 is formed on this lower end of the sleeve and projects radially therefrom. This arm is apertured to receive the threaded end 37 of a rod 38 which extends to the vicinity of the intermediate portion of the windshield and cowling. The inner end of this rod 38 is pivotally connected, by means of a pin 39, to a handle or lever 40 at a point offset from the pivot pin 41 for the member 40. This pivot pin is carried by a block 42 secured to the upstanding flange 11 of the cowling 10. An instrument board 43, forming a portion of the vehicle body, is positioned to conceal the mounting for the handle or lever 40 and the rod 38. To permit of adjustment between the rod 38 and the arm 36, the threaded end 37 of the rod is provided with adjustable stops 45.

While only one sliding block 22 and its associated actuating sleeve 24 and housing 29 have been illustrated and described, it is to be understood that the remaining end portion of the windshield 17 may be, and preferably is provided with similar mechanism. A second rod 38 is connected to the handle or lever 40 for actuating this second controlling unit.

The operation of this controlled mechanism may be described as follows:

When it is desired to move the windshield from the full line position illustrated in Fig. 2 to the dot-and-dash line position illustrated in this figure, or to any other desired adjusted position, the handle or lever 40 is pivoted from the position illustrated in Fig. 1 to a position where the lever extends substantially vertically. This causes a longitudinal movement of the rod 38 which will rotate the controlling sleeve 24 for causing the block 21 to oscillate slightly relative the housing 29, for disengaging the teeth formed on this block from the teeth formed on an edge of the housing. The windshield then may be moved into the desired open position and the handle or lever 40 then should be returned to its initial position. This return movement of the handle shifts the rod 38 for causing rotation of the control sleeve 24, with the result that the block 21 will be oscillated in the opposite direction for placing its teeth in mating engagement with the teeth of the housing 29. The slidable block 21, then will be held against longitudinal movement with respect to the sleeve 24 and housing 29, and the windshield will be located in this open position.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. In combination, a windshield frame, a windshield pivotally connected to the frame, a cowling forming one edge portion of the windshield frame, a bracing arm pivotally connected to the windshield, retaining means operatively associated with the free end of the bracing arm and the frame of the windshield for retaining the windshield in any desired position of adjustment, means mounted entirely upon said cowling and operatively connected with the retaining means for actuating the latter and an instrument board spaced from the cowling and said actuating means and positioned to conceal a material portion of the means mounted on the cowling.

2. In combination, a frame having two offset portions, a windshield pivotally connected to the frame to swing outwardly and upwardly and to be entirely seated in one offset portion and to form a wall for the other offset portion when closed, a bracing member pivotally connected to the windshield, a block pivotally connected to the free end of the bracing member and means entirely mounted on the second offset portion of said frame for retaining the block in different positions of adjustment with respect to the frame.

3. In combination with a frame having an opensided offset portion, a windshield pivotally connected to the frame and overlying one open side only of said offset portion when closed, a bracing arm pivotally connected at one end to the windshield, a slotted housing connected to the frame to occupy said offset portion and having its slot facing another open side thereof, means carried by the free end of the bracing arm and slidably received within the housing and means associated with the housing for retaining the means carried by the free end of the bracing arm in any desired position of adjustment with respect to the housing.

EDWARD L. KRAFT.